(12) United States Patent
Meng et al.

(10) Patent No.: US 9,030,580 B2
(45) Date of Patent: May 12, 2015

(54) COLOR FILTER MODULES FOR PLENOPTIC XYZ IMAGING SYSTEMS

(71) Applicants: Lingfei Meng, Redwood City, CA (US); Kathrin Berkner, Los Altos, CA (US); Ivana Tosic, Berkeley, CA (US)

(72) Inventors: Lingfei Meng, Redwood City, CA (US); Kathrin Berkner, Los Altos, CA (US); Ivana Tosic, Berkeley, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/040,653

(22) Filed: Sep. 28, 2013

(65) Prior Publication Data

US 2015/0092071 A1    Apr. 2, 2015

(51) Int. Cl.
| | |
|---|---|
| H04N 9/083 | (2006.01) |
| H04N 17/02 | (2006.01) |
| H04N 5/225 | (2006.01) |
| G06K 9/00 | (2006.01) |
| H04N 9/09 | (2006.01) |
| H04N 5/235 | (2006.01) |

(52) U.S. Cl.
CPC .............. *H04N 9/09* (2013.01); *H04N 5/2355* (2013.01)

(58) Field of Classification Search
USPC ......... 348/187, 188, 267, 273, 340, 342, 360, 348/361; 382/274, 275, 167
See application file for complete search history.

(56) References Cited

U.S. PATENT DOCUMENTS

| | | | |
|---|---|---|---|
| 5,227,890 A | 7/1993 | Dowski | |
| 5,521,695 A | 5/1996 | Cathey et al. | |
| 5,748,371 A | 5/1998 | Cathey et al. | |
| 5,870,179 A | 2/1999 | Cathey et al. | |
| 5,926,283 A | 7/1999 | Hopkins | |
| 5,982,497 A | 11/1999 | Hopkins | |
| 6,021,005 A | 2/2000 | Cathey et al. | |
| 6,069,738 A | 5/2000 | Cathey et al. | |
| 6,525,302 B2 | 2/2003 | Dowski et al. | |
| 6,842,297 B2 | 1/2005 | Dowski | |
| 6,873,733 B2 | 3/2005 | Dowski | |
| 6,911,638 B2 | 6/2005 | Dowski et al. | |
| 6,940,649 B2 | 9/2005 | Dowski | |
| 7,433,042 B1 | 10/2008 | Cavanaugh et al. | |
| 7,616,841 B2 | 11/2009 | Robinson et al. | |
| 7,616,842 B2 | 11/2009 | Robinson | |
| 7,692,709 B2 | 4/2010 | Robinson et al. | |
| 7,932,941 B2* | 4/2011 | Hayasaka et al. | 348/267 |
| 8,121,439 B2* | 2/2012 | Robinson et al. | 382/312 |
| 8,143,565 B2* | 3/2012 | Berkner et al. | 250/208.1 |
| 8,248,511 B2 | 8/2012 | Robinson et al. | |
| 8,345,144 B1* | 1/2013 | Georgiev et al. | 348/340 |
| 8,531,581 B2* | 9/2013 | Shroff et al. | 348/340 |

(Continued)

FOREIGN PATENT DOCUMENTS

JP      2013187914 A  *  9/2013

OTHER PUBLICATIONS

Meng et al.; "Evaluation of multispectral plenoptic camera"; Feb. 4, 2013; Proc. SPIE. 8660, Digital Photography IX, 86600D. (Feb. 4, 2013) doi: 10.1117/12.2006293.*

(Continued)

*Primary Examiner* — John Villecco
(74) *Attorney, Agent, or Firm* — Fenwick & West LLP (57) ABSTRACT

A method for designing a color filter module used in a plenoptic XYZ imaging system. In one approach, the color filter module is spatially partitioned into filter cells, and the spatial partition is designed by considering data captured at the sensor in light of variations in $\Delta E$.

34 Claims, 7 Drawing Sheets
(3 of 7 Drawing Sheet(s) Filed in Color)

(56) References Cited

U.S. PATENT DOCUMENTS

| | | | |
|---|---|---|---|
| 8,605,199 B2* | 12/2013 | Imai | 348/342 |
| 8,619,179 B2* | 12/2013 | Imai | 348/342 |
| 8,761,534 B2* | 6/2014 | Shroff et al. | 382/254 |
| 2002/0118457 A1 | 8/2002 | Dowski | |
| 2002/0195548 A1 | 12/2002 | Dowski et al. | |
| 2003/0057353 A1 | 3/2003 | Dowski et al. | |
| 2003/0169944 A1 | 9/2003 | Dowski et al. | |
| 2003/0173502 A1 | 9/2003 | Dowski et al. | |
| 2004/0145808 A1 | 7/2004 | Cathey et al. | |
| 2004/0190762 A1 | 9/2004 | Dowski et al. | |
| 2004/0228005 A1 | 11/2004 | Dowski | |
| 2004/0257543 A1 | 12/2004 | Dowski et al. | |
| 2005/0088745 A1 | 4/2005 | Cathey et al. | |
| 2005/0197809 A1 | 9/2005 | Dowski et al. | |
| 2005/0264886 A1 | 12/2005 | Dowski | |
| 2006/0187311 A1 | 8/2006 | Labaziewicz et al. | |
| 2007/0081224 A1 | 4/2007 | Robinson et al. | |
| 2008/0204744 A1 | 8/2008 | Mir et al. | |
| 2008/0266655 A1 | 10/2008 | Levoy et al. | |
| 2009/0096914 A1 | 4/2009 | Domenicali | |
| 2009/0128658 A1* | 5/2009 | Hayasaka et al. | 348/222.1 |
| 2009/0135282 A1 | 5/2009 | Gidon | |
| 2010/0253941 A1 | 10/2010 | Brady et al. | |
| 2010/0299113 A1* | 11/2010 | Robinson et al. | 703/2 |
| 2011/0073752 A1* | 3/2011 | Berkner et al. | 250/227.2 |
| 2011/0122467 A1* | 5/2011 | Futterer et al. | 359/9 |
| 2012/0182438 A1* | 7/2012 | Berkner et al. | 348/222.1 |
| 2012/0226480 A1* | 9/2012 | Berkner et al. | 703/1 |
| 2012/0300091 A1* | 11/2012 | Shroff et al. | 348/222.1 |
| 2013/0002928 A1* | 1/2013 | Imai | 348/333.11 |
| 2013/0215236 A1* | 8/2013 | Shroff et al. | 348/49 |
| 2013/0216123 A1* | 8/2013 | Shroff et al. | 382/154 |
| 2013/0216124 A1* | 8/2013 | Shroff et al. | 382/154 |
| 2013/0216125 A1* | 8/2013 | Shroff et al. | 382/154 |
| 2013/0222606 A1* | 8/2013 | Pitts et al. | 348/187 |
| 2013/0229530 A1* | 9/2013 | Hubel et al. | 348/187 |
| 2013/0229532 A1* | 9/2013 | Tsutsumi | 348/187 |
| 2014/0019098 A1* | 1/2014 | Shroff et al. | 703/1 |
| 2014/0146184 A1* | 5/2014 | Meng et al. | 348/187 |
| 2014/0146201 A1* | 5/2014 | Knight et al. | 348/231.99 |
| 2014/0176540 A1* | 6/2014 | Tosic et al. | 345/420 |
| 2014/0192255 A1* | 7/2014 | Shroff et al. | 348/362 |
| 2014/0226044 A1* | 8/2014 | Parvaresh et al. | 348/272 |
| 2014/0241615 A1* | 8/2014 | Shroff et al. | 382/154 |
| 2014/0253738 A1* | 9/2014 | Mullis | 348/187 |

OTHER PUBLICATIONS

Berkner et al; "Design framework for a spectral mask for plenoptic camera"; Jan. 22, 2012; Proc. SPIE. 8299, Digital Photography VIII, 82990A. (Jan. 22, 2012) doi: 10.1117/12.910335.*

Georgiev et al.; "Rich image capture with plenoptic cameras"; Mar. 29, 2010; 2010 IEEE International Conference on Computational Photography; IEEE; pp. 1-8.*

Cathey, W. Thomas et al., "New Paradigm for Imaging Systems," Applied Optics, Oct. 10, 2002, pp. 6080-6092, vol. 41.

Cavanaugh, D.B. et al., "VNIR Hypersensor Camera System," Proc. SPIE, conference Aug. 3, 2009, online publication Aug. 17, 2009, 17 pages, vol. 7457.

Choi, J. et al., "Zoom Lens Design for a Novel Imaging Spectrometer That Controls Spatial and Spectral Resolution Individually," Applied Optics, 2006, pp. 3430-3441, vol. 45.

Elliott, K.H., "A Novel Zoom-Lens Spectrograph for a Small Astronomical Telescope," Mon. Not. R. Astron. Soc., 1996, pp. 158-162, vol. 281.

European Extended Search Report, European Application No. 12157955.1, Mar. 14, 2013, 7 pages.

Fife, K. et al., "A Multi-Aperture Image Sensor with 0.7 Pixels in 0.11 CMOS Technology," IEEE Journal of Solid-State Circuits, Dec. 2008, pp. 2990-3005, vol. 43, No. 12.

Fife, K. et al., "A 3D Multi-Aperture Image Sensor Architecture," Proc. of IEEE Custom Integrated Circuits Conference, 2006, pp. 281-284.

Gehm, M. et al., "Single-Shot Compressive Spectral Imaging with a Dual-Disperser Architecture," Optics Express, Oct. 17, 2007, pp. 14013-14027, vol. 15, No. 21.

Harvey, A.R. et al., "Spectral Imaging in a Snapshot," Proc. of SPIE, 2005, pp. 110-119, vol. 5694.

Harvey, A.R. et al., "Technology Options for Hyperspectral Imaging," Proc. of SPIE, 2000, pp. 13-24, vol. 4132.

Horstmeyer, R. et al., "Flexible Multimodal Camera Using a Light Field Architecture," 2009 IEEE International Conference on Computational Photography, Apr. 16, 2009, pp. 1-8.

Maeda, P. Y. et al., "Integrating Lens Design with Digital Camera Simulation," 5678 SPIE Proceedings SPIE Electronic Imaging, Feb. 2005, pp. 48-58, San Jose, CA.

Shogenji, R. et al., "Multispectral Imaging Using Compound Optics," Optics Express, Apr. 19, 2004, pp. 1643-1655, vol. 12, No. 8.

Arras, K.O., "An Introduction to Error Propagation: Derivation, Meaning, and Examples of Equation CY =FXCXFTX," Technical report EPFL, EPFL-ASL-TR-98-01 R3, Sep. 1998, 22 pages.

Burns, P.D. et al., Error Propagation Analysis in Color Measurement and Imaging, Color Research and Application, Aug. 1997, pp. 280-289, vol. 2, Issue 4.

Burns, P.D. et al., "Image Noise and Colorimetric Precision in Multispectral Image Capture," Proc. Sixth Color Imaging Conference: Color Science, Systems and Applications, IS&T/SID, 1998, pp. 83-85.

* cited by examiner

COLOR FILTER MODULES FOR PLENOPTIC XYZ IMAGING SYSTEMS

BACKGROUND OF THE INVENTION

1. Field of the Invention

This invention relates generally to the design of color filter modules in plenoptic XYZ imaging systems.

2. Description of the Related Art

Color filters are commonly used in order to enable color imaging. For example, the Bayer filter is a common arrangement of red, green and blue filters placed directly over a sensor array in order to create RGB imaging systems. The CIE XYZ color space is another formulation of color that has advantage over the more commonly used RGB color space. One advantage of an imaging system using XYZ filters is that the spectral sensitivities of the X, Y, and Z filters are much closer to the CIE standard observer color matching functions (the red, green and blue curves that represent an average human's chromatic response) than those of the R, G, and B filters used in conventional RGB imaging systems. As a result, an XYZ imaging system can reproduce these XYZ values more accurately than a conventional RGB imaging system. However, it is difficult to fabricate good XYZ filters and even more difficult to fabricate XYZ color filters at a size and in a pattern that can be placed over a sensor array. As a result, XYZ imaging systems are not so common, despite the advantages of the XYZ color space.

Furthermore, for colorimetric applications, it is important to define a suitable evaluation metric for the color imaging system. Color accuracy may be evaluated using the Delta-E ($\Delta E$) metric defined in the CIE (International Commission on Illumination) standard. However, due to effects such as noise introduced by the sensor array and variations in the manufacture and assembly of optical systems, use of the $\Delta E$ metric alone may be inadequate to evaluate the performance of a color imaging system. Conversely, a color imaging system designed on the basis of the $\Delta E$ metric alone may be suboptimal.

Thus there is a need for improvements in designing color imaging systems.

SUMMARY OF THE INVENTION

The present invention overcomes the limitations of the prior art by providing an approach for designing a color filter module for use in a plenoptic XYZ imaging system, based on variations in $\Delta E$.

The use of a plenoptic imaging system overcomes some of the difficulties of manufacturing XYZ color filters to be placed over a sensor array. A plenoptic XYZ imaging system includes two overlapping imaging systems: a primary imaging subsystem and a secondary imaging array (e.g., a microlens array). The secondary imaging array is placed at the image plane of the primary imaging subsystem. A sensor array is placed at the image plane of the secondary imaging array. A color filter module is placed at a conjugate plane of the sensor array. The sensor array then captures multiplexed XYZ images of the object, as filtered by the color filter module. Since the color filter module is placed at a conjugate plane of the sensor array, it can be much larger and therefore easier to manufacture and assemble.

In one aspect, the color filter module is designed as follows. A model of the object to be imaged by the plenoptic XYZ imaging system is received. A candidate design for the color filter module is also received. The candidate design includes a candidate spatial partition of the filter module into filter cells. The filter cells preferably implement X, Y and Z filter responses. The operation of the plenoptic XYZ imaging system with the candidate filter module is modeled. Variations in $\Delta E$ (e.g., the var($\Delta E$)) are calculated as a function of the modeled operation. The candidate spatial partition of filter cells is modified based on the calculated variations.

Other aspects include different geometries for the spatial partition of the color filter module, and different approaches to design the color filter module based on the calculated variations. In one design approach, the object includes different colors, var($\Delta E$) is calculated for the different colors X, Y and Z, and the candidate spatial partition of filter cells is modified based on an average of the var($\Delta E$) calculated for the different colors. In another aspect, the candidate spatial partition of filter cells is modified through iterative optimization.

Other aspects of the invention include devices, systems and computer readable media for implementing these methods, as well as devices and systems designed using these methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

System Overview.

Figure 1A:
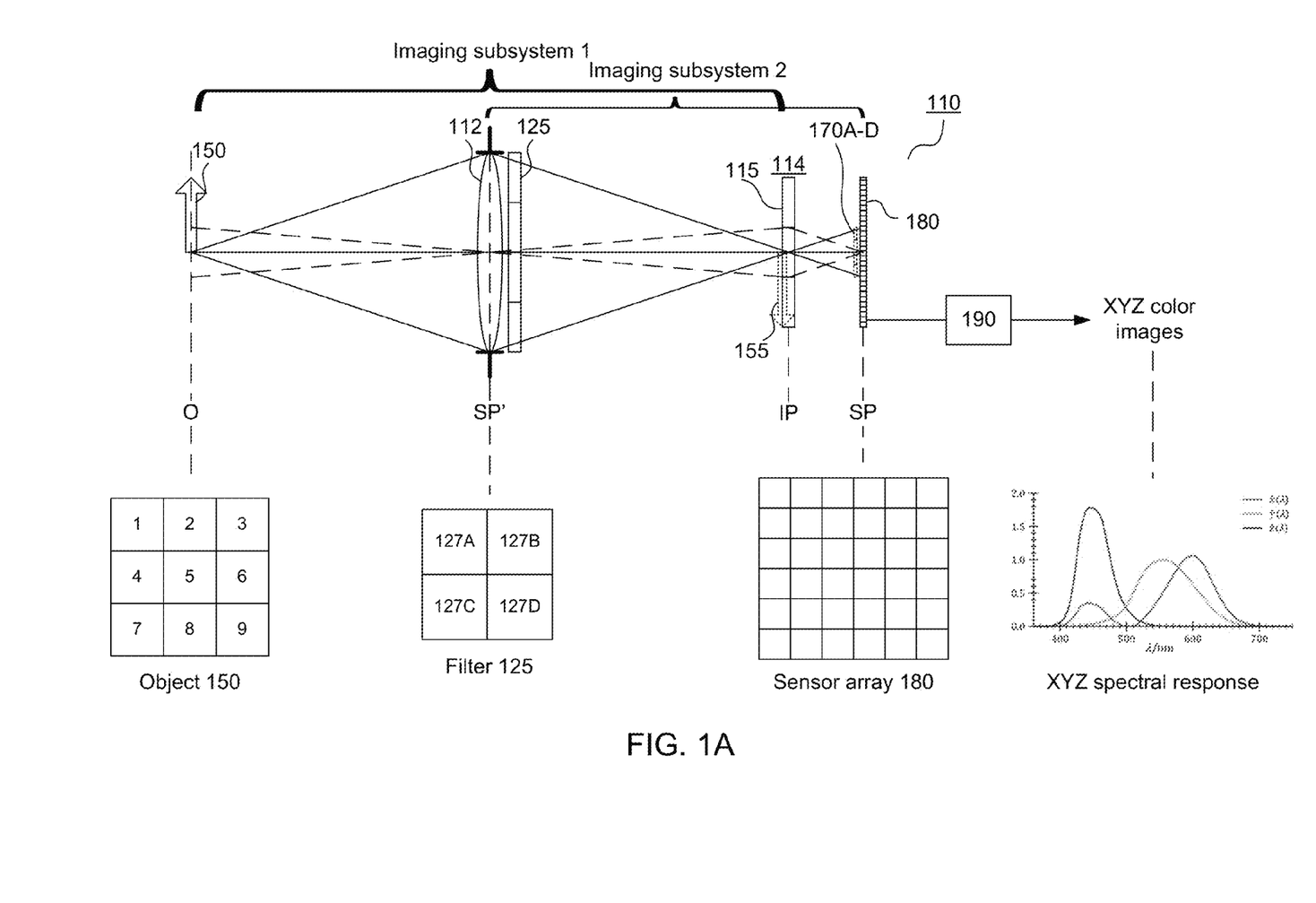
FIGS. 1A-1B are diagrams illustrating an example plenoptic XYZ imaging system according to the invention.
Figure 1B:
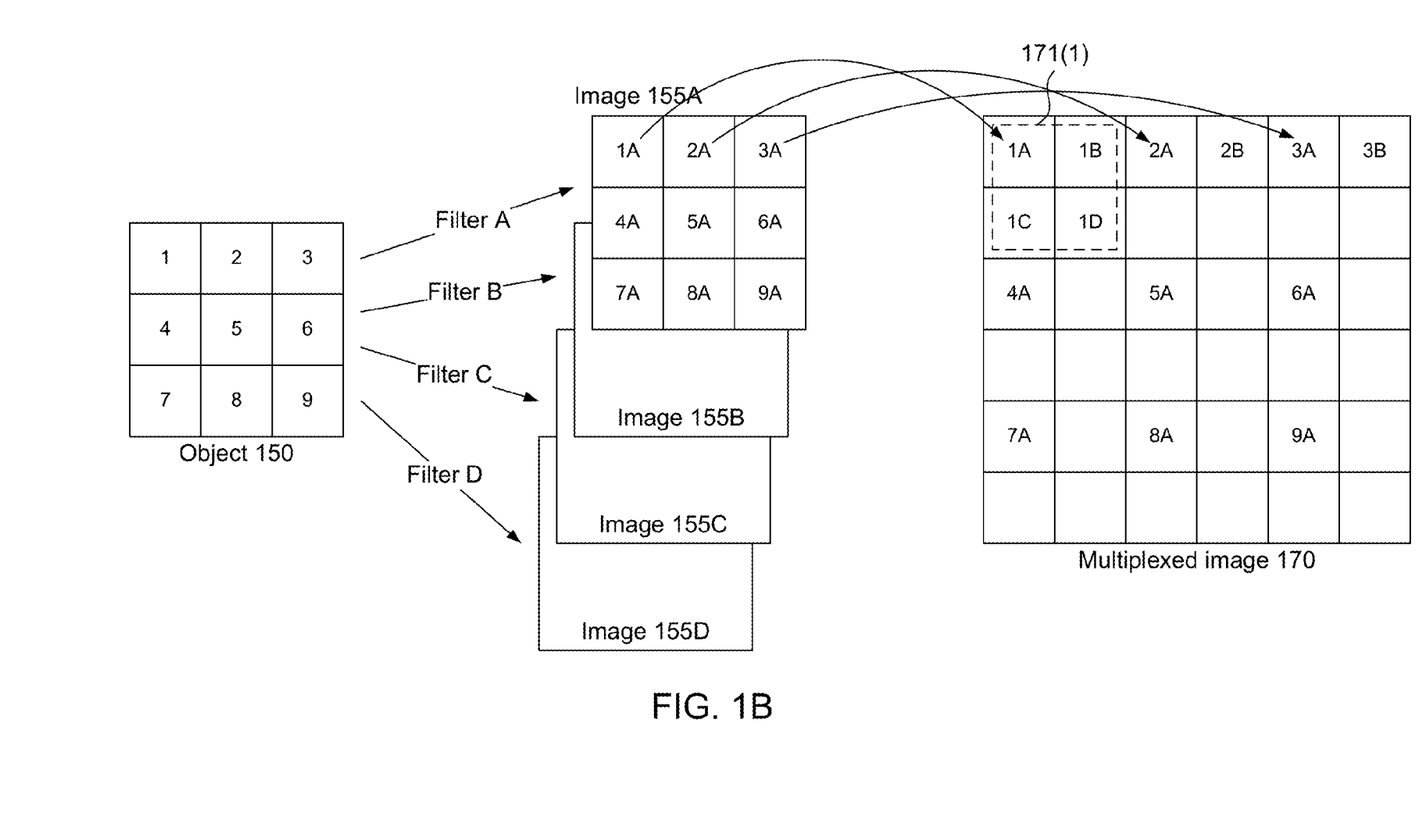

FIGS. 1A-1B are diagrams illustrating an example plenoptic XYZ imaging system according to the invention. The plenoptic XYZ imaging system 110 includes a primary imaging subsystem 112 (represented by a single lens in FIG. 1A), a secondary imaging array 114 (an array of image forming elements 115) and a sensor array 180. The secondary imaging array 114 may be referred to as a microimaging array. These form two overlapping imaging subsystems, shown as subsystem 1 and subsystem 2 in FIG. 1A.

For convenience, the optical imaging group 112 is depicted in FIG. 1A as a single objective lens, but it should be understood that it could contain multiple elements. The objective lens 112 forms an optical image 155 of the object 150 at an image plane IP. The microimaging array 114 is located at the image plane IP. The system in its entirety forms spatially multiplexed and interleaved optical images 170 at the sensor plane SP. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1A.

A color filter module 125 is positioned at a plane SP' conjugate to the sensor plane SP. The actual physical location may be before, after or in the middle of the optical imaging group 112. The color filter module contains a number of spatially multiplexed filter cells 127A-D. In this example, the color filter module 125 includes a rectangular array of filter cells 127, as shown in the bottom portion of FIG. 1A.

The bottom portion of FIG. 1A provides more detail. In this diagram, the object 150 is divided into a 3×3 array of regions, which are labeled 1-9. The color filter module 125 is a 2×2 rectangular array of individual filter cells 127A-D. For example, each filter cell 127A-D may have a different spectral response. The sensor array 180 is shown as a 6×6 rectangular array.

FIG. 1B illustrates conceptually how the spatially multiplexed optical images 170A-D are produced and interleaved at sensor array 180. The object 150, if captured and filtered by filter cell 127A, would produce an optical image 155A. To distinguish optical image 155A from an unfiltered image of the object, the 3×3 regions are labeled with the suffix A: 1A-9A. Similarly, the object 150 filtered by filter cells 127B, C,D, would produce corresponding optical images 155B,C,D with 3×3 regions labeled 1B-9B, 1C-9C and 1D-9D. Each of these four optical images 155A-D is filtered by a different filter cell 127A-D within filter module 125 but they are all produced simultaneously by the imaging system 110.

The four optical images 155A-D are formed in an interleaved fashion at the sensor plane, as shown in FIG. 1B. Using image 155A as an example, the 3×3 regions 1A-9A from optical image 155A are not contiguous in a 3×3 block within optical image 170. Rather, regions 1A, 1B, 1C and 1D, from the four different optical images, are arranged in a 2×2 fashion in the upper left of optical image 170 (the inversion of image 170 is neglected for clarity). Regions 2-9 are similarly arranged. Thus, the regions 1A-9A that make up optical image 170A are spread out across the composite optical image 170, separated by portions of the other optical images 170B-D. Put in another way, if the sensor is a rectangular array of individual sensor elements, the overall array can be divided into rectangular subarrays 171(1)-(9) of sensor elements (only one subarray 171(1) is shown in FIG. 1B). For each region 1-9, all of the corresponding regions from each filtered image are imaged onto the subarray. For example, regions 1A, 1B, 1C and 1D are all imaged onto subarray 171(1). Note that since the filter module 125 and sensor assembly 180 are located in conjugate planes, each imaging element 115 in array 114 forms an image of the filter module 125 at the sensor plane SP. Since there are multiple imaging elements 115, multiple images 171 of the filter module 125 are formed.

The multiplexed image 170 can then be processed by processing module 190 to reconstruct desired images of the object. The processing could be deinterleaving and demultiplexing. It could also include more sophisticated image processing. In this example, the desired images are XYZ color images of the object 150. FIG. 1A includes a diagram illustrating the XYZ spectral responses defined in the standard. As shown in FIG. 1A, each spectral sensitivity curve shows the corresponding filter's transmittance vs. wavelength. For example, the Y and Z spectral responses each have a single peak in their spectral transmittance, while the X spectral response has two spectral transmittance peaks. In one implementation, the color filter module 125 is designed so that each filter cell 127 has an X, Y or Z response. In another approach, the X response is implemented using two filter cells 127, one for each of the two peaks.

It should be noted that FIG. 1 has been simplified to illustrate underlying concepts. For example, the object 150 was artificially divided into an array in order to more easily explain the overall imaging function. The invention is not limited to arrayed objects. As another example, most practical systems will use significantly larger arrays, particularly at the sensor assembly and possibly also at the filter module. In addition, there need not be a 1:1 relationship between the 6×6 regions at the sensor plane and the underlying sensor elements in the sensor array. Each region could correspond to multiple sensor elements, for example. As a final example, the regions labeled 1 in the object, 1A in the filtered image 155A and 1A in the composite image 170 do not have to be exact images of each other. In some designs, region 1A within image 170 may capture the filtered energy approximately from region 1 in the object 150, but it may not actually be an image of region 1. Thus, the energy collected by sensor elements in region 1A of image 170 may be integrating and sampling the image (or some transformation of the image) in region 1 in object 150, rather than representing a geometrical reproduction of the object at that region. In addition, effects such as parallax, vignetting, diffraction and optical propagation may affect any image formation.

The approach shown in FIG. 1 has several advantages. First, multiple optical images 170A-D are captured simultaneously at the sensor plane. Second, each captured image is filtered by a filter cell 127A-D within the color filter module 125, and each filter cell 127 may be designed to implement different filtering functions. Furthermore, since the color filter module 125 is located at a conjugate plane SP' rather than the actual sensor plane SP, and since this typically means that the color filter module will be much larger compared to what would be required at the sensor plane, the tolerances and other mechanical requirements are relaxed. This makes it easier to manipulate the color filter module, compared to if the color filter module were located at the sensor plane (e.g., if attached to the sensor assembly).

Design Approach Overview.

Note that multiple images 170 are spatially multiplexed at the sensor 180 (in an interleaved fashion), and that each image 170 is filtered by a different filter cell 127A-D but the filtering is applied at the conjugate sensor plane (i.e., at the aperture) not at the actual sensor plane. One drawback of this approach is that the conjugate plane SP' typically will not be perfectly imaged onto the sensor plane SP. Effects such as distortion, parallax and aberrations (both geometric and chromatic) may cause crosstalk between adjacent multiplexed images at the sensor plane. Referring to FIG. 1B, imperfect imaging may cause images 1A and 1B to blend together, at least at the boundaries. The net effect is that the blended image captured by the sensors 180 no longer represents the object filtered by only filter A or by only filter B, but as filtered by some combination of filters A and B. This crosstalk between filters A and B is usually undesirable.

Figure 2:
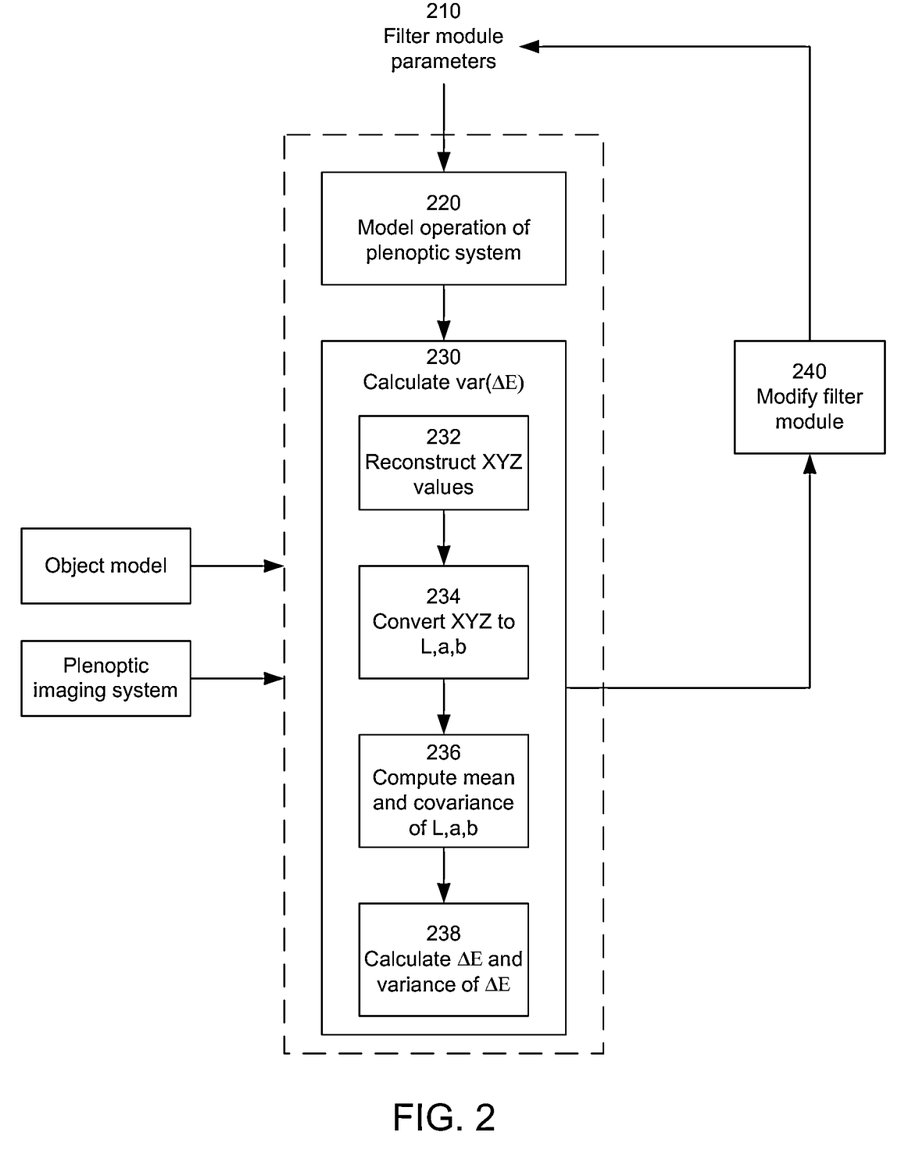
FIG. 2 is a flow diagram for an example method to design plenoptic XYZ imaging systems, according to the invention.

System properties, such as crosstalk between filters, noise, and manufacturing and assembly variations, are important factors to consider when designing the color filter module. FIG. 2 is a flow diagram for an example method to design plenoptic XYZ imaging systems, which accounts for these system properties. The color filter module is parameterized 210. Given a candidate design for the color filter module 210, a computer system models 220 the overall plenoptic image formation by the XYZ plenoptic imaging system. This typically includes both a model of the object, and a description of the plenoptic imaging system (including the color filter module). This is used to calculate 230 ΔE and also variations in ΔE. This is used as feedback to improve 240 the design of the color filter module.

FIG. 2 also illustrates a more specific example of the more general approach. In this specific example, the color filter module is modeled as a set of filter cells with known spectral response. Specifically, the filter cells implement X, Y and Z filter responses, but the spatial partition of the filter module into filter cells is parameterized and optimized. That is, the boundaries between filter cells are being designed.

Given a candidate design 210 for the color filter module, a computer system models 220 the image formation of the XYZ plenoptic imaging system. This typically includes modeling the source, the propagation through the optics, the detector behavior (e.g., sensor spectral sensitivity) and subsequent processing. The object model can include both illumination and reflectance properties. For example, a common object for these purposes is a color test chart illuminated by a source. In this case, the spectral characteristics of the source illumination are as important as the color responses of the test chart. The propagation through the optics can be modeled in different ways. Wave propagation and ray tracing are two approaches. In one approach, a simulation uses non-paraxial ray tracing. The spectral response of the color filter module accounts for the incident angle of the rays. This is important for XYZ filters since they may be constructed as interference filters, which have a spectral response that is dependent on the incident angle. Additional details and approaches to modeling propagation and optimizing the color filter module are provided in U.S. patent application Ser. No. 13/040,809, "Design of filter modules for aperture-coded, multiplexed imaging systems," which is incorporated by reference herein.

The resulting modeling is used to calculate 230 a performance metric, which in this example is based at least in part on var(ΔE). FIG. 2 shows an example implementation of step 230. A model of sensor data based on ray tracing can be expressed as:

$$b = \Phi r + n. \quad (1)$$

Here, b is the measurement data by the sensor, Φ is the optical response of the system, r is the object model, and n is the noise (mainly noise introduced by the sensor). The optical response may include manufacturing variations and alignment variations (shift, tilt, on axis, off axis), etc.

In one embodiment, the optical response is modeled as a matrix Φ, for which a pseudo-inverse operation, represented by a multiplication with the pseudo-inverse matrix $\Phi^+$ of Φ, can be performed. XYZ color values are reconstructed 232 as:

$$\begin{bmatrix} X \\ Y \\ Z \end{bmatrix} = \Phi^+(\Phi r + n). \quad (2)$$

This step 232 is also referred to as spectral demultiplexing.

The reconstructed XYZ data is converted 234 to CIELAB using the CIE 1976 color space:

$$\begin{bmatrix} L \\ a \\ b \end{bmatrix} = M \begin{bmatrix} w_1 \\ w_2 \\ w_3 \end{bmatrix} + t. \quad (3)$$

where $w_1 = f\left(\frac{X}{X_n}\right)$, $w_2 = f\left(\frac{Y}{Y_n}\right)$, $w_3 = f\left(\frac{Z}{Z_n}\right)$, $$M = \begin{bmatrix} 0 & 116 & 0 \\ 500 & -500 & 0 \\ 0 & 200 & -200 \end{bmatrix}$$

$$t = \begin{bmatrix} -16 \\ 0 \\ 0 \end{bmatrix}$$

$$f(u) = \begin{cases} u^{\frac{1}{3}} & \text{if } u > \left(\frac{6}{29}\right)^3 \\ \frac{1}{3}\left(\frac{29}{6}\right)^2 u + \frac{4}{29} & \text{otherwise} \end{cases}$$

X, Y, Z are the tristimulus values of the object, and $X_n$, $Y_n$, $Z_n$ are the tristimulus values of a white object color stimulus.

At step 236, the mean and covariance of L, a, b (Lab) are computed. For example, assuming the XYZ values estimated at the sensor to be random variables with covariance matrix $\Sigma_w$, then the covariance of the Lab values $[L, a, b]^T$ is given by the covariance matrix $\Sigma_{Lab}$:

$$\Sigma_{Lab} = M\Sigma_w M^T \quad (4)$$

The mean values of Lab can be similarly computed. The covariance $\Sigma_{Lab}$ is due to variations in signal (i.e., due to noise) and also variations in manufacturing, alignment, etc.

The computed mean and covariance of Lab are used to calculate 238 ΔE and the variance of ΔE. Generally, ΔE stands for the accuracy of the L, a, b predictions and quantifies the absolute color difference. In one embodiment, ΔE is calculated as:

$$\Delta E = \sqrt{(L - L')^2 + (a - a')^2 + (b - b')^2}. \quad (5)$$

Here, L, a, b are the predicted measurements from the plenoptic XYZ imaging system, and L', a', b' are CIELAB reference values measured based on CIE standard (D65 standard illuminant, 1931 CIE standard observer). In other words, the values L', a', b' are considered "the truth." The formula in Eq. (5) calculates the ΔE value according to the CIE76 standard. Other standards, such as CIE94 or CIEDE2000, can be used as well. The reference values L', a', b' can also be measured with respect to a different illuminant, e.g. D50 or D55. A different standard observer, other than CIE 1931, can also be used.

As described above, the variance of ΔE accounts for noise, manufacturing variation, variation in the position of the color filter module, and the like. The variance of ΔE is calculated as follows. For simplicity, we use g to represent the ΔE function, i.e., $\Delta E = g(v_1, v_2, v_3)$, where $v_1 = L-L'$, $v_2 = a-a'$, $v_3 = b-b'$ are random variables with means $\mu_1, \mu_2, \mu_3$ and covariance matrix $\Sigma_{Lab}$. The variables $v_1, v_2, v_3$ are also referred to as ΔL, Δa, Δb, respectively. We approximate g with the following linear approximation $$h(v_1, v_2, v_3) = g(\mu_1, \mu_2, \mu_3) + \frac{\partial g}{\partial v_1}\bigg|_{v_1=\mu_1} \cdot (v_1 - \mu_1) + \frac{\partial g}{\partial v_2}\bigg|_{v_2=\mu_2} \cdot (v_2 - \mu_2) + \frac{\partial g}{\partial v_3}\bigg|_{v_3=\mu_3} \cdot (v_3 - \mu_3), \quad (6)$$

This is a first-order Taylor series expansion with respect to ΔL, Δa and Δb. Then the variance of g is approximated by the variance of h as $$\text{Var}(\Delta E) = \quad (7)$$

$$\text{Var}(g) \approx \text{Var}(h(v_1, v_2, v_3)) = \left(\frac{\partial g}{\partial v_1}\bigg|_{v_1=\mu_1}\right)^2 \sigma_L^2 +$$

$$\left(\frac{\partial g}{\partial v_2}\bigg|_{v_2=\mu_2}\right)^2 \sigma_a^2 + \left(\frac{\partial g}{\partial v_3}\bigg|_{v_3=\mu_3}\right)^2 \sigma_b^2 + \ldots$$

$$2\frac{\partial g}{\partial v_1}\bigg|_{v_1=\mu_1}\frac{\partial g}{\partial v_2}\bigg|_{v_2=\mu_2} \text{Cov}(v_1, v_2) + \ldots$$

$$2\frac{\partial g}{\partial v_1}\bigg|_{v_1=\mu_1}\frac{\partial g}{\partial v_3}\bigg|_{v_3=\mu_3} \text{Cov}(v_1, v_3) + \ldots$$

$$2\frac{\partial g}{\partial v_2}\bigg|_{v_2=\mu_2}\frac{\partial g}{\partial v_3}\bigg|_{v_3=\mu_3} \text{Cov}(v_2, v_3),$$

where $\sigma_L$, $\tau_a$, and $\sigma_b$ each represents the standard deviation associated with the $v_1$, $v_2$, $v_3$ variables, respectively. Since $v_1 = L-L'$, $v_2 = a-a'$, $v_3 = b-b'$, we have $$\text{Cov}(v_1, v_2) = \Sigma_{Lab}(1,2), \text{Cov}(v_1, v_3) = \Sigma_{Lab}(1,3), \text{Cov}(v_2, v_3) = \Sigma_{Lab}(2,3). \quad (8)$$

The calculated var(ΔE) affects the performance metric of the plenoptic XYZ imaging system and can be used to optimize the color filter module. In one embodiment, the modification of the candidate spatial partition is done through iteratively optimizing the candidate spatial partition based on var(ΔE). Such iterative optimization may be done through perturbation of the filter cell boundaries. For example, optimization is accomplished when a minimum var(ΔE) is found, and the spatial partition of the color filter module corresponding to the minimum var(ΔE) is the optimized spatial partition.

In another embodiment, the modification of the candidate spatial partition is done through exhaustive search. For example, a design space for the spatial partition for the color filter module is sampled. The var(ΔE) for each sample in the design space is calculated. A candidate spatial partition is then selected based on the calculated var(ΔE). For instance, the spatial partition corresponding to a minimum var(ΔE) among all the sampled points is selected as the optimized spatial partition of the color filter module.

In another embodiment, the estimated mean of ΔE values is used in the optimization in replacement of or in addition to the variance. The mean of ΔE describes the accuracy of the estimated Lab values and can be used to evaluate crosstalk between the images of two neighboring filter cells on the sensor.

Figure 3A:
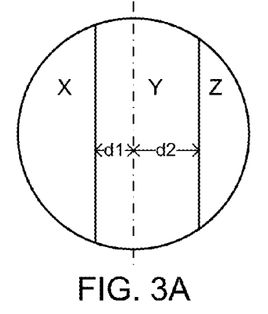
FIGS. 3A-3G illustrate various examples of spatial partitions and parametrizations for an XYZ color filter module.

FIGS. 3A-3G illustrate various examples of spatial partitions and parameterizations for the color filter module. In FIG. 3A, the filter module contains filter cells separated by boundaries, all of which are parallel to each other. That is, the filter cells are parallel stripes. The partitions are X, Y, Z color filters, respectively. Two parameters are used to characterize the partition: d1 and d2. In the example shown in FIG. 3A, both d1 and d2 are measured from the center of the filter, as indicated by the arrows in the figure. Note that the filter cells need not be the same size. This is sometimes referred to as a "stripes" partition.

Figure 3B:
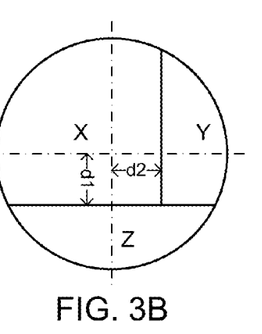

In FIG. 3B, the filter module contains filter cells separated by boundaries, all of which are either parallel or perpendicular to each other. The particular example shown is referred to as "T-junction" partition because the two boundary lines form a T. This partition is also parameterized by two parameters: d1 and d2, both of which are measured from the center of the filter.

Figure 3C:
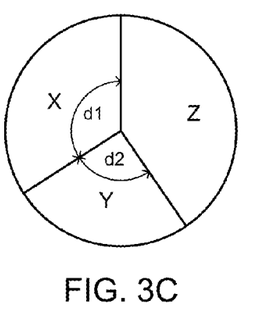
Figure 3D:
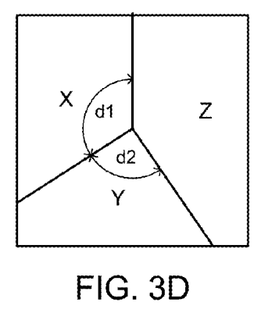

In FIG. 3C, the filter module contains filter cells separated by boundaries, all of which radiate out from a common point. This is referred to as a "pie chart" partition. In this example, the common point is the center of the filter. In other cases, the common point can be any point within the filter. The partition shown in FIG. 3C also has two parameters: d1 and d2, which are the angles subtended by the X and Y filters, respectively. FIG. 3D shows a rectangular shaped filter module with a "Czech flag" partition of filter cells. This is basically the pie chart partition but with a rectangular outside border. Rectangular outside borders can also be used with the other partitions.

Figure 3E:
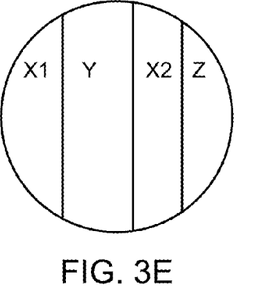
Figure 3F:
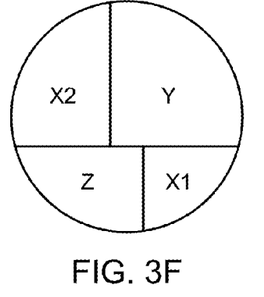
Figure 3G:
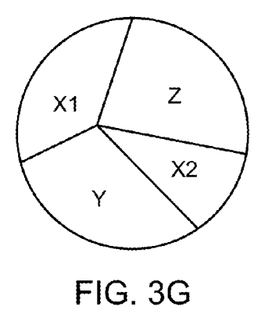

FIGS. 3E-3G show some further examples that have 4 filter cells. In these examples, the X spectral response is implemented by two filter cells: X1 and X2, which implement the lower and upper lobes of the X spectral response. FIG. 3E shows a 4-filter "stripe" partition. FIG. 3F shows a 4-filter partition using Manhattan geometry boundaries. FIG. 3G shows a 4-filter "pie chart" partition with offset center. Other spatial partitions are also possible. The outside border of the filter module is shown in the examples as either rectangular or circular, but it could also be other shapes (e.g., elliptical).

The spatial partition of the filter module into filter cells can also be parameterized in other ways. For example, the parameterization can be designed to permit modification of the position and/or size of filter cells within the filter module. Global modifications can also be made, for example scaling the entire filter module. The number of filter cells can also be variable. There may be multiple X, Y or Z filter cells. The order of the filters can also be optimized. For example X, Y, Z could be arranged as Y, X, Z, which may have less cross-talk.

In some cases, the optical properties for the filter cells may be determined a priori, in which case determining the spatial partition is the primary task in designing the filter module. An example might be if a certain spectral response is desired (e.g., detecting X, Y and Z components of an object), or if a certain spectral response is manufacturable. In other cases, the optical properties for the filter cells may be iterated in addition to the spatial partitioning. The same is true for the rest of the XYZ plenoptic imaging system. That is, in some cases, the rest of the imaging system (or certain components within the imaging system) may also be iterated based on the performance metric.

Filter Optimization: An Example.

Figure 4A:
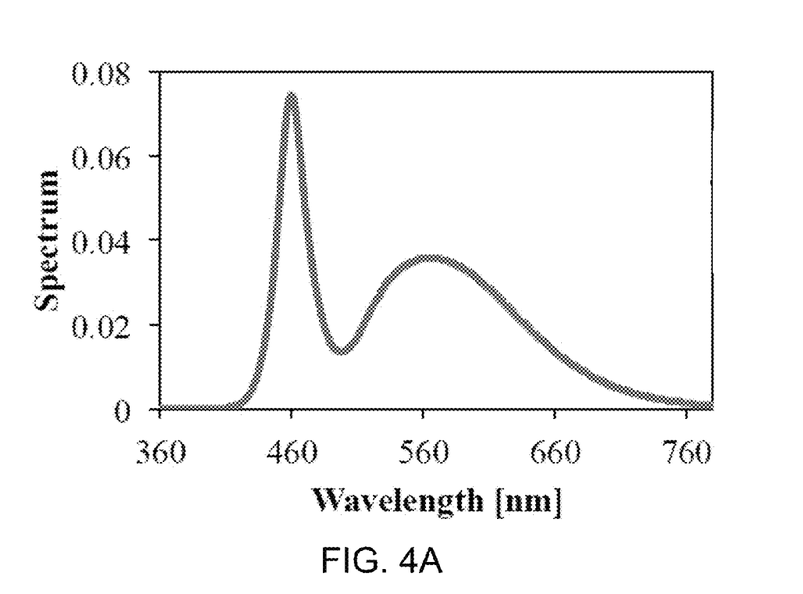
FIG. 4A is a graph of the spectral response of an LED source.
Figure 4B:
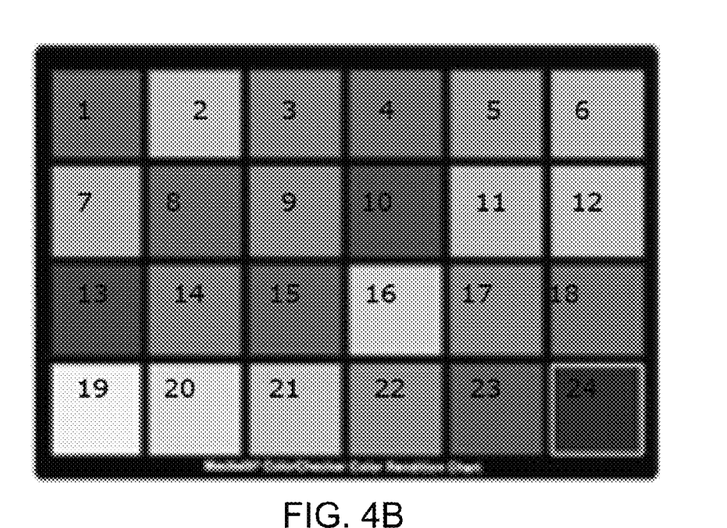
FIG. 4B illustrates a color test chart with 24 different color patches.

This section describes an example of filter optimization in a plenoptic XYZ imaging system using the var(ΔE) metric. In this example, the object 150 is a color test chart illuminated by an LED. FIG. 4A shows the spectral response of the LED, which is approximately 360 nm wide over the range of approximately 400-760 nm. FIG. 4b shows the color test chart, which is a two-dimensional checkerboard with 24 different color patches. Each color patch has a predefined spectral response. For example, color patch #1 is brown, color patch #2 is pink, color patch #24 is black, and so on. In other applications, different color test charts and different sources may be used.

Figure 5A:
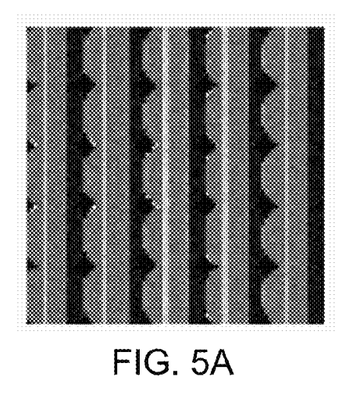
FIGS. 5A and 5B illustrate simulated images for (A) color patch #1 and (B) color patch #24, using a striped color filter module.
Figure 5B:
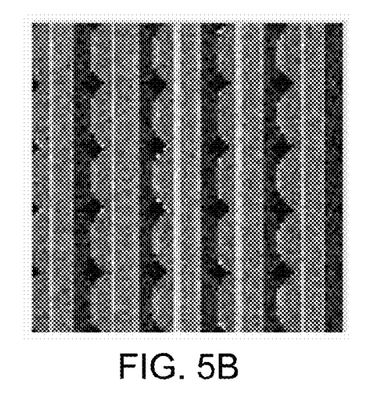
Figure 6A:
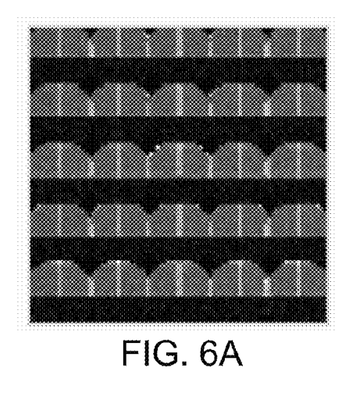
FIGS. 6A and 6B illustrate simulated images for (A) color patch #1 and (B) color patch #24, using a T-junction color filter module.
Figure 6B:
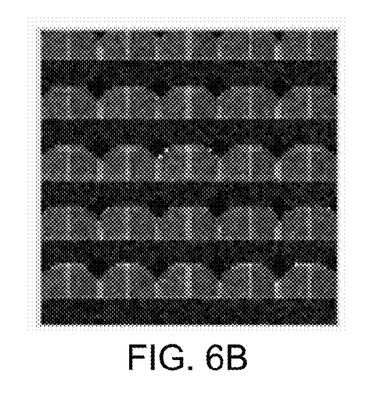
Figure 7A:
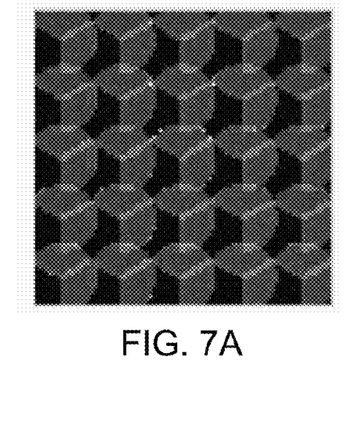
FIGS. 7A and 7B illustrate simulated images for (A) color patch #1 and (B) color patch #24, using a pie chart color filter module.
Figure 7B:
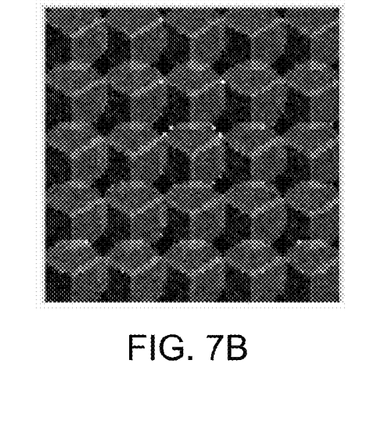

FIGS. 5-7 illustrate simulated sensor data, in order to demonstrate the effects of noise. In this example, this type of simulated sensor data is not used in the evaluation and optimization of the color filter module. Rather, the design process is based on the optical response of the plenoptic imaging system and on the object model (e.g., illumination power and spectrum, reflectance values, etc.). A model of the sensor response plus noise is then used, rather than actual simulation of sensor operation. One advantage of this approach is that the simulation of actual sensor data is not needed.

FIGS. 5A and 5B illustrate simulated sensor data for (A) color patch #1 and (B) color patch #24, using a striped color filter module as shown in FIG. 3A. The image in FIG. 5B is noisier than the image in FIG. 5A. This is because color patch #24 is black and therefore allows a smaller amount of light to pass through than color patch #1, which is brown. Since the simulation takes into account the signal dependent noise, FIG. 5A has a higher signal-to-noise ratio than FIG. 5B. The same is true for FIG. 6A vs. FIG. 6B, and FIG. 7A vs. FIG. 7B. In particular, FIGS. 6A and 6B illustrate simulated images for (A) color patch #1 and (B) color patch #24, using a T-junction color filter module as shown in FIG. 3B. FIGS. 7A and 7B illustrate simulated images for (A) color patch #1 and (B) color patch #24, using a pie chart color filter module as shown in FIG. 3C.

In this example, var($\Delta E$) is calculated for each color patch. In one approach, the modification of the candidate spatial partition of filter cells is based on the average of the different var($\Delta E$) calculated for the different colors. For example, such an average may be a weighted average of the var($\Delta E$). In another approach, the modification of the candidate spatial partition of filter cells is based on a worst of the var($\Delta E$) calculated for the different colors.

Figure 8:
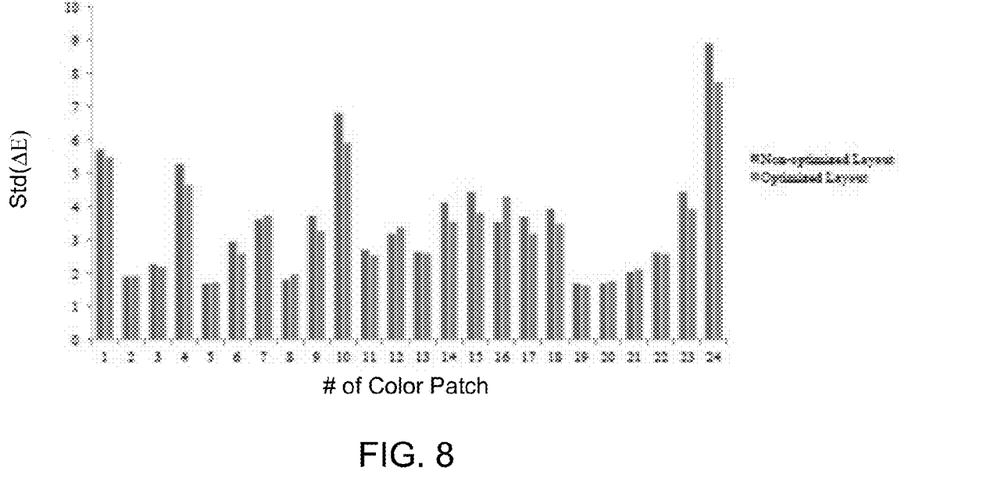
FIG. 8 illustrates an example of spatial partition optimization of filter cells based on the calculated var($\Delta E$).

FIG. 8 illustrates an example of a spatial partition optimization of filter cells based on the calculated var($\Delta E$). In this example, the color filter module is a T-junction design. FIG. 8 plots var($\Delta E$) (actually, std($\Delta E$)) for the filter layout before and after optimization. Each of the 24 pairs of bars shows the std($\Delta E$) for one of the 24 color patches. The left bar is the std($\Delta E$) before optimization and the right bar is the std($\Delta E$) after optimization. This optimization uses an average of the std($\Delta E$) calculated for each color patch as the performance metric and then finds the minimum of that metric through exhaustive search.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computer-implemented method for designing a color filter module for use in a plenoptic XYZ imaging system that captures XYZ images of an object, the plenoptic XYZ imaging system comprising a primary imaging subsystem, a secondary imaging array and a sensor array, the sensor array capturing multiplexed images of the object, the color filter module positioned approximately in a conjugate plane to the sensor array to provide spectral filtering of the multiplexed images, the computer-implemented method comprising a computer system performing the steps of:
receiving a model of an object to be imaged by the plenoptic XYZ imaging system;
receiving a candidate design for the color filter module, the candidate design for the color filter module including a candidate spatial partition of filter cells within the color filter module, the filter cells implementing an X filter response, a Y filter response and a Z filter response;
modeling operation of the plenoptic XYZ imaging system with the candidate color filter module;
calculating variation of $\Delta E$ as a function of the modelled operation; and
modifying the candidate spatial partition of filter cells based on the calculated variation of $\Delta E$.

2. The computer-implemented method of claim 1 wherein the filter module contains filter cells separated by boundaries, all of which are parallel to each other.

3. The computer-implemented method of claim 1 wherein the filter module contains filter cells separated by boundaries, all of which radiate out from a common point.

4. The computer-implemented method of claim 1 wherein the filter module contains filter cells separated by boundaries, all of which are either parallel or perpendicular to each other.

5. The computer-implemented method of claim 1 wherein the filter module contains a filter cell with an X filter response, another filter cell with a Y filter response, and yet another filter cell with a Z filter response.

6. The computer-implemented method of claim 1 wherein the filter module contains a filter cell with a Y filter response, another filter cell with a Z filter response, and two or more additional filter cells that together implement an X filter response.

7. The computer-implemented method of claim 1 wherein the object comprises different colors, var($\Delta E$) is calculated for the different colors, and modifying the candidate spatial partition of filter cells is based on an average of the var($\Delta E$) calculated for the different colors.

8. The computer-implemented method of claim 1 wherein the object comprises different colors, var($\Delta E$) is calculated for the different colors, and modifying the candidate spatial partition of filter cells is based on a worst of the var($\Delta E$) calculated for the different colors.

9. The computer-implemented method of claim 1 wherein variation in $\Delta E$ is caused by noise.

10. The computer-implemented method of claim 1 wherein variation in $\Delta E$ is caused by manufacturing variation.

11. The computer-implemented method of claim 1 wherein variation in $\Delta E$ is caused by variation in a position of the color filter module.

12. The computer-implemented method of claim 1 wherein var($\Delta E$) is calculated as a function of $\Delta L$, $\Delta a$ and $\Delta b$.

13. The computer-implemented method of claim 12 wherein var($\Delta E$) is calculated as a Taylor series expansion with respect to $\Delta L$, $\Delta a$ and $\Delta b$.

14. The computer-implemented method of claim 1 wherein the model of the object comprises a model of a spectral response of a color test chart and a model of a source illuminating the color test chart.

15. The computer-implemented method of claim 1 wherein modeling operation of the plenoptic XYZ imaging system comprises modeling a spectral response of the color filter module as a function of incident angle.

16. The computer-implemented method of claim 1 wherein modifying the candidate spatial partition comprises:
sampling a design space for the spatial partition for the color filter module;
calculating var($\Delta E$) for each sample in the design space; and
selecting a candidate spatial partition based on the calculated var($\Delta E$).

17. The computer-implemented method of claim 1 wherein modifying the candidate spatial partition comprises:
iteratively optimizing the candidation spatial partition based on var($\Delta E$).

18. A non-transitory computer readable medium containing software instructions that, when executed on a computer system, cause the computer system to perform a method for designing a color filter module for use in a plenoptic XYZ imaging system that captures XYZ images of an object, the plenoptic XYZ imaging system comprising a primary imaging subsystem, a secondary imaging array and a sensor array, the sensor array capturing multiplexed images of the object, the color filter module positioned approximately in a conjugate plane to the sensor array to provide spectral filtering of the multiplexed images, the computer-implemented method comprising:
receiving a model of an object to be imaged by a plenoptic XYZ imaging system,
receiving a candidate design for the color filter module, the candidate design for the color filter module including a candidate spatial partition of filter cells within the color filter module, the filter cells implementing an X filter response, a Y filter response and a Z filter response;
modeling operation of the plenoptic XYZ imaging system with the candidate color filter module;
calculating variation in $\Delta E$ as a function of the modelled operation; and
modifying the candidate spatial partition of filter cells based on the calculated variation in $\Delta E$.

19. The non-transitory computer readable medium of claim 18 wherein, in the computer-implemented method, the filter module contains filter cells separated by boundaries, all of which are parallel to each other.

20. The non-transitory computer readable medium of claim 18 wherein, in the computer-implemented method, the filter module contains filter cells separated by boundaries, all of which radiate out from a common point.

21. The non-transitory computer readable medium of claim 18 wherein, in the computer-implemented method, the filter module contains filter cells separated by boundaries, all of which are either parallel or perpendicular to each other.

22. The non-transitory computer readable medium of claim 18 wherein, in the computer-implemented method, the filter module contains a filter cell with an X filter response, another filter cell with a Y filter response, and yet another filter cell with a Z filter response.

23. The non-transitory computer readable medium of claim 18 wherein, in the computer-implemented method, the filter module contains a filter cell with a Y filter response, another filter cell with a Z filter response, and two or more additional filter cells that together implement an X filter response.

24. The non-transitory computer readable medium of claim 18 wherein, in the computer-implemented method, the object comprises different colors, var($\Delta E$) is calculated for the different colors, and modifying the candidate spatial partition of filter cells is based on an average of the var($\Delta E$) calculated for the different colors.

25. The non-transitory computer readable medium of claim 18 wherein, in the computer-implemented method, the object comprises different colors, var($\Delta E$) is calculated for the different colors, and modifying the candidate spatial partition of filter cells is based on a worst of the var($\Delta E$) calculated for the different colors.

26. The non-transitory computer readable medium of claim 18 wherein, in the computer-implemented method, variation in $\Delta E$ is caused by noise.

27. The non-transitory computer readable medium of claim 18 wherein, in the computer-implemented method, variation in $\Delta E$ is caused by manufacturing variation.

28. The non-transitory computer readable medium of claim 18 wherein, in the computer-implemented method, variation in $\Delta E$ is caused by variation in a position of the color filter module.

29. The non-transitory computer readable medium of claim 18 wherein, in the computer-implemented method, var($\Delta E$) is calculated as a function of $\Delta L$, $\Delta a$ and $\Delta b$.

30. The non-transitory computer readable medium of claim 29 wherein, in the computer-implemented method, var($\Delta E$) is calculated as a Taylor series expansion with respect to $\Delta L$, $\Delta a$ and $\Delta b$.

31. The non-transitory computer readable medium of claim 18 wherein, in the computer-implemented method, the model of the object comprises a model of a spectral response of a color test chart and a model of a source illuminating the color test chart.

32. The non-transitory computer readable medium of claim 18 wherein, in the computer-implemented method, modeling operation of the plenoptic XYZ imaging system comprises modeling a spectral response of the color filter module as a function of incident angle.

33. The non-transitory computer readable medium of claim 18 wherein, in the computer-implemented method, modifying the candidate spatial partition comprises:
sampling a design space for the spatial partition for the color filter module;
calculating var($\Delta E$) for each sample in the design space; and
selecting a candidate spatial partition based on the calculated var($\Delta E$).

34. The non-transitory computer readable medium of claim 18 wherein, in the computer-implemented method, modifying the candidate spatial partition comprises:
iteratively optimizing the candidation spatial partition based on var($\Delta E$).

* * * * *